United States Patent [19]
Habiger

[11] 3,995,426
[45] Dec. 7, 1976

[54] MECHANICAL LINKAGE FOR HYDROSTATIC CONTROL SYSTEM

[75] Inventor: Cyril William Habiger, Joliet, Ill.

[73] Assignee: Caterpillar Tractor Co., Peoria, Ill.

[22] Filed: Nov. 19, 1975

[21] Appl. No.: 633,352

[52] U.S. Cl. .............................. 60/486; 180/6.48; 74/480 R
[51] Int. Cl.[2] ....................................... F15B 13/09
[58] Field of Search ............ 180/6.48; 60/420, 421, 60/427, 486; 74/471 R, 480 R

[56] References Cited
UNITED STATES PATENTS

| 3,500,633 | 3/1970 | Livezey | 60/427 X |
| 3,504,493 | 4/1970 | Potter et al. | 60/421 |
| 3,898,811 | 8/1975 | Seaberg | 60/421 |

*Primary Examiner*—Edgar W. Geoghegan
*Attorney, Agent, or Firm*—Phillips, Moore, Weissenberger, Lempio & Strabala

[57] ABSTRACT

The invention is concerned with an improved mechanical arrangement for controlling the steering and speed function of a hydrostatic control system for a ground driven vehicle. Such a control system comprises a pair of hydrostatic pumps each controlled by a rotatable arm extending from a servo valve mounted thereon along with a pair of hydrostatic motors each driven by a respective one of the pumps and a pair of ground engaging means each on respective sides of the vehicle. The improvement of the invention comprises a pair of pump adjusting means, one for each of the pumps, comprising a first crank having a first end and a second end, pivotally mounted intermediate said ends adjacent a respective one of the pumps; a steering linkage pivotally mounted adjacent the first end of the first crank; a connecting link pivotally mounted adjacent a first end thereof adjacent the second end of the first crank; a first linear member pivotally mounted adjacent its first end adjacent a second end of the connecting link and pivotally mounted adjacent its second end to the arm of the servo valve; a second linear member pivotally mounted adjacent its first end adjacent the first end of the first member and the second end of the connecting link and a second crank pivotally mounted adjacent its first end adjacent a second end of the second member. The improvement further includes tying means pivotally mounted adjacent a second end of each of the second cranks directly linking their movement.

7 Claims, 5 Drawing Figures

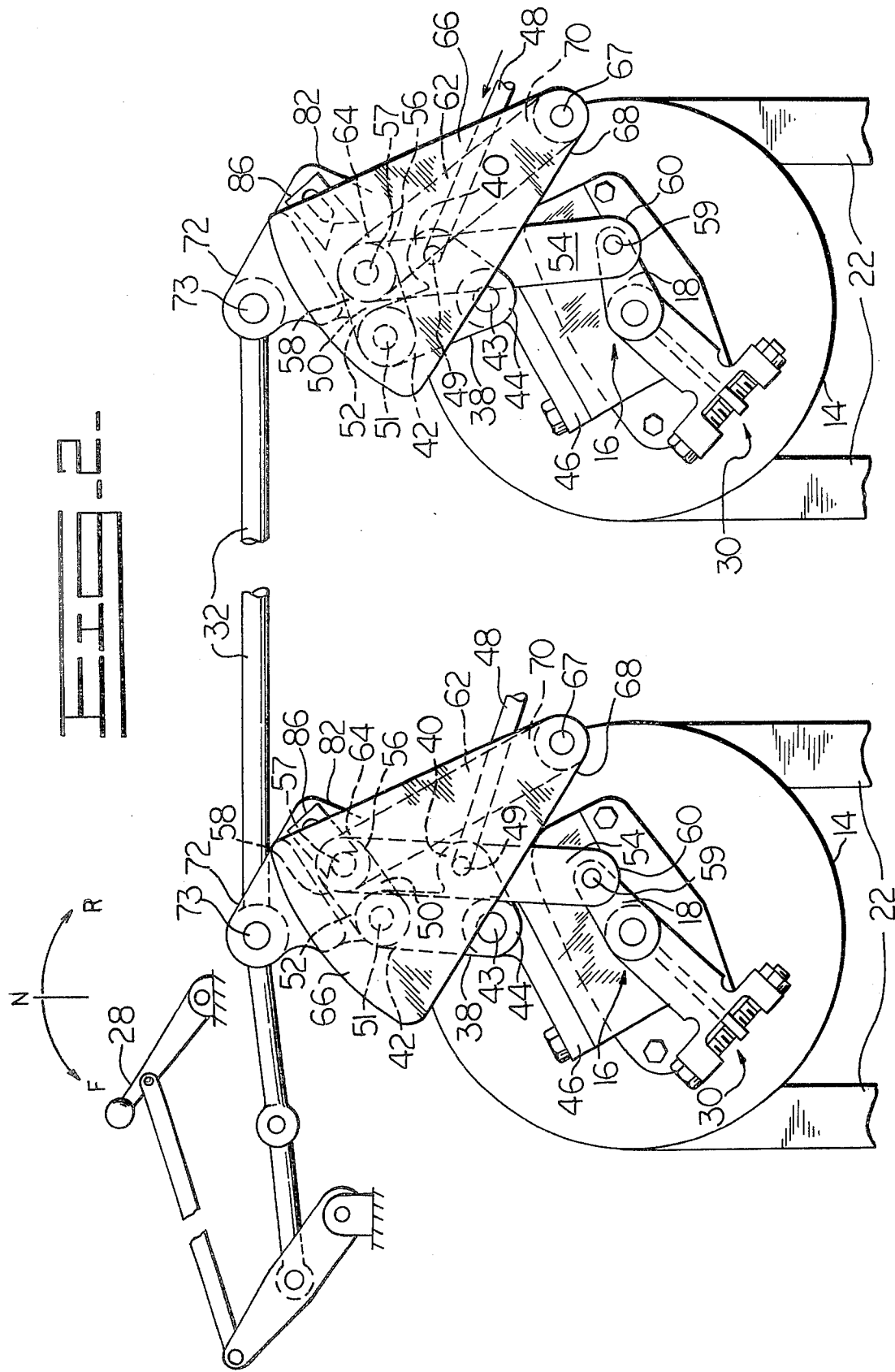

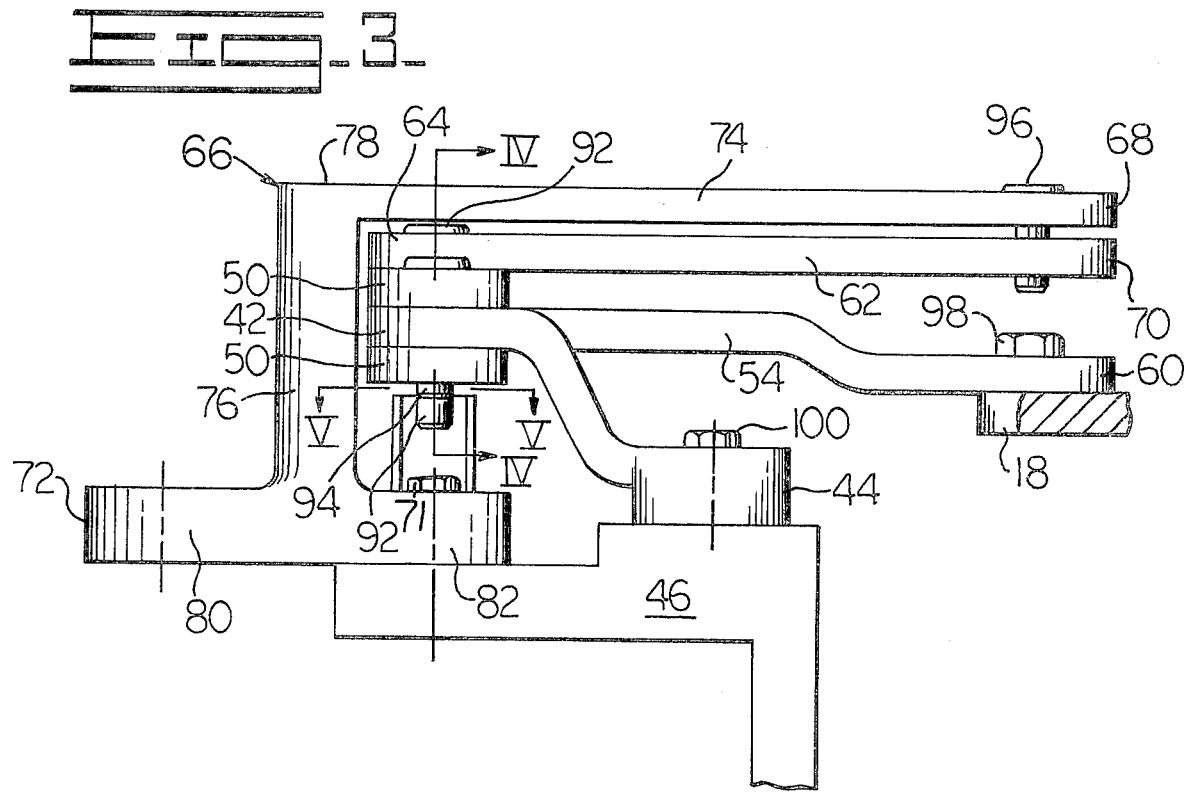
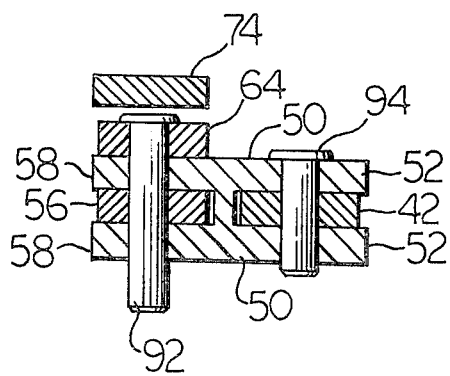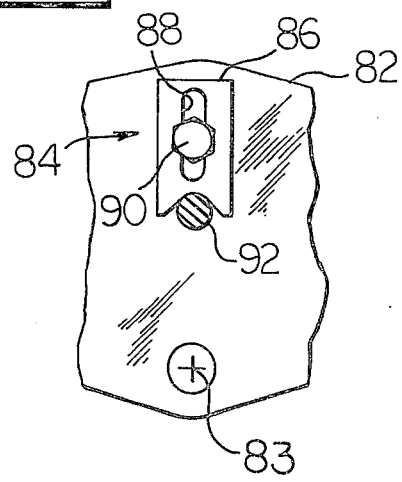

{ 3,995,426 }

1

MECHANICAL LINKAGE FOR HYDROSTATIC CONTROL SYSTEM

BACKGROUND OF THE INVENTION

1. Field of the Invention

The invention is concerned with a hydrostatic control system for a ground driven vehicle, which hydrostatic control system comprises a pair of hydrostatic pumps each controlled by a servo valve and a pair of hydrostatic motors each driven by a respective one of the pumps. Each of the motors drives ground engaging means such as endless treads, one motor driving the treads on one side of a vehicle and the other motor driving the treads on the other side of the vehicle. More particularly, the invention is concerned with an improved mechanical arrangement for controlling the steering and speed functions of the control system.

2. Prior Art

Use of hydraulic cylinders in connection with slot type arrangements to provide the steering functions of hydrostatic control systems is well known but has the disadvantages of being expensive and sometimes troublesome in use. In prticular, the cost of manufacturing the slot type arrangement is expensive as are the hydraulic cylinders, the steering valve and required connecting hoses. Further, good steering control through use of hydraulic cylinders is harder to obtain than with a mechanical type arrangement wherein direct control is provided. Also, hydraulic cylinders cause jerk during initial movement from their zero position. Yet further, an all mechanical arrangement is easier to service.

The present invention is concerned with a particularly useful mechanical arrangement which provides control for both the steering and speed functions of a hydrostatic control system. The improved mechanical arrangement of the present invention allows very direct control through its solely mechanical linkage with corresponding direct response of ground engaging means driven by hydrostatic motors the pumps of which are controlled by said linkage. The steering portion of the mechanical arrangement of the present invention is such that it allows spot turns of a vehicle as by rotating one set of wheels or treads on an endless belt in one direction while rotating the wheels or treads on the other side of the vehicle in an opposite direction. These and other advantages realized by the use of the mechanical arrangement of the present invention will become apparent from reading the following description and from examination of the accompanying drawings.

SUMMARY OF THE INVENTION

The invention comprises an improved mechanical arrangement for controlling the steering and speed functions of a hydrostatic control system for a ground driven vehicle which comprises a pair of hydrostatic pumps each controlled by a rotatable arm extending from servo valve means mounted thereon, a pair of hydrostatic motors each driven by a respective one of said pumps and a pair of ground engaging means each on a respective side of said vehicle. The improved mechanical arrangement comprises a pair of pump adjusting means, one for each of said pumps, each adjusting means comprising a first crank having a first and a second end, pivotally mounted intermediate its ends adjacent a respective one of said pumps; steering linkage means drivingly linked adjacent the first end of said first crank; a connecting link having a first end drivingly linked adjacent the second end of said first crank; a first generally linearly extending member drivingly linked adjacent its first end adjacent a second end of said connecting link and drivingly linked adjacent its second end to said arm of said servo valve means; a second generally linearly extending member drivingly linked adjacent its first end adjacent said first end of said first member and said second end of said connecting link; and a second crank drivingly linked adjacent its first end adjacent a second end of said second member. Also a part of the mechanical arrangement of the present invention is tying means drivingly linked adjacent a second end of said second cranks directly linking their movement.

BRIEF DESCRIPTION OF THE DRAWINGS

The invention will be better understood by reference to the figures of the drawings wherein like numbers denote like parts throughout and wherein:

FIG. 2 illustrates the mechanical arrangement of the present invention with the drive lever therefore thrown into the forward position;

FIG. 3 illustrates in partial side elevation view one of the pump adjusting means of the present invention;

FIG. 4 illustrates a view taken along the plane IV—IV of FIG. 3; and

FIG. 5 illustrates a view taken in direction V—V of FIG. 3.

DETAILED DESCRIPTION OF THE PREFERRED EMBODIMENT

Figure 1:
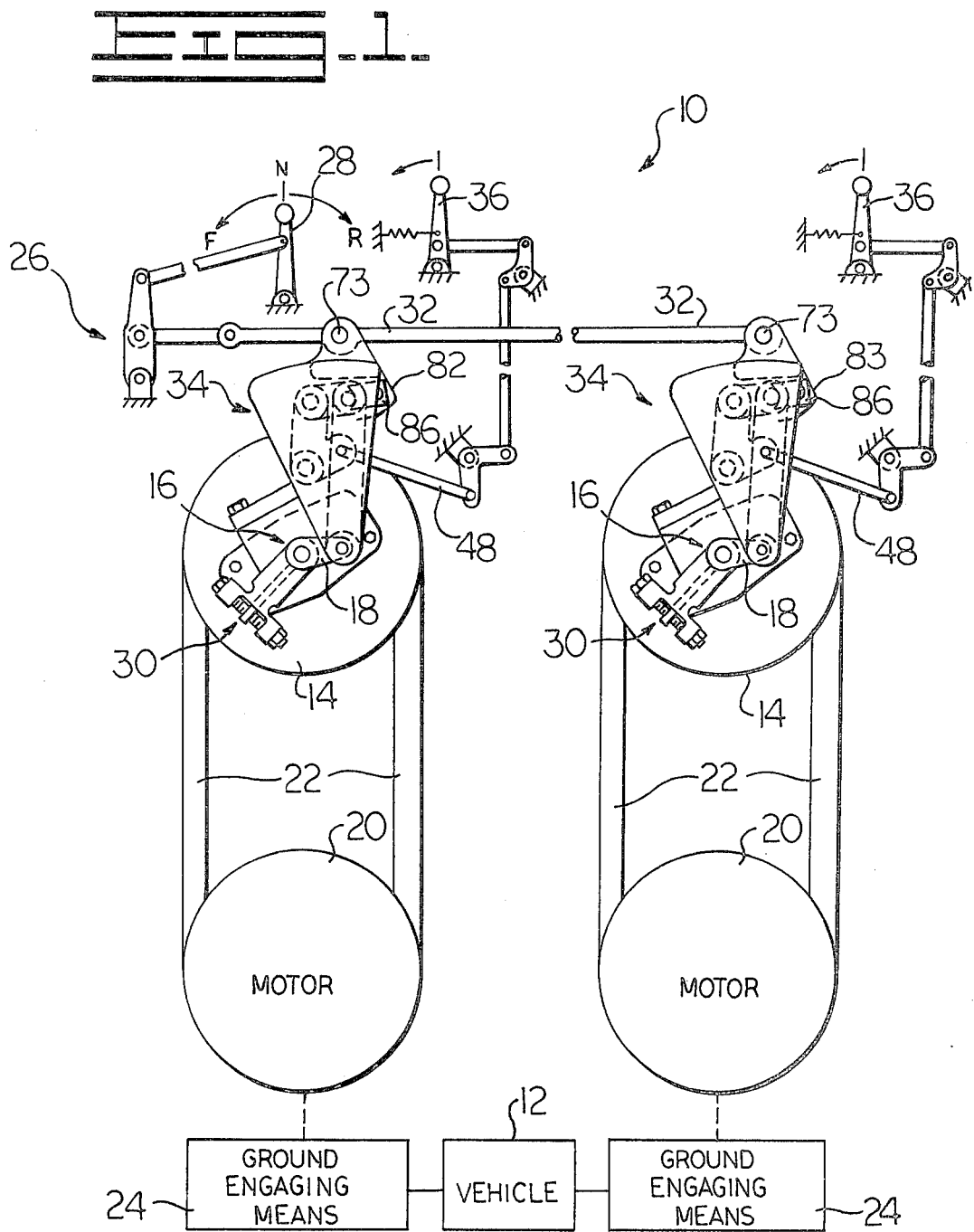
FIG. 1 illustrates schematically a vehicle having ground engaging means on each side thereof, each of which ground engaging means is driven by a hydrostatic motor which is itself driven by a hydrostatic pump controlled by the mechanical linkage of the present invention.

Referring first to FIG. 1 there is illustrated therein a hydrostatic control system 10 for a ground driven vehicle 12. The system 12 comprises a pair of hydrostatic pumps 14 each controlled by a servo valve 16 which is itself adjusted by a rotatable arm 18 which extends from the servo valve 16. The servo valves 16 are mounted to the pumps 14. A pair of hydrostatic motors 20 are driven in a normal manner via conduit means 22, each of the motors 20 having ground engaging means 24 such as an endless belt or tires on a respective side of the vehicle 12.

The heart of the present invention lies in an improved mechanical arrangement 26 for controlling the the steering and speed functions of the system 10. The speed function of the system 10 is controlled by throwing a shift lever 28 or the like in a forward or reverse direction. In a neutral position, a servo valve null adjuster 30 is adjusted so as not to move the ground engaging means 24. The shift lever 28 is used to cause movement of tying means, e.g., a tie rod 32, which is pivotally attached to each of a pair of pump adjusting means 34, one for each of the pumps 14. The tie rod 32, as illustrated in FIGS. 1 and 2, directly links the movement of the pair of pump adjusting means 34. This is important in providing accurate and positive activation of the pump adjusting means 34 and thus of the pumps 14 and the motors 20. A pair of individual ground engaging means levers 36 are provided one linked to each of the pump adjusting means 34. The ground engaging means levers 36 each control in an overriding manner the speed and direction of a respective one of the ground engaging means 24.

The structure of each of the pair of pump adjusting means 34 will be better understood by reference to FIGS. 2–5. Each of the pump adjusting means 34 includes a first crank 38 having a first end 40 and a second end 42. The first crank 38 is pivotally mounted at a first fixed pivot 43 intermediate its ends 40 and 42 adjacent a respective one of the pumps 14. Generally, the first crank 38 is a generally V-shaped crank and is pivotally mounted at the fixed pivot 43 adjacent an apex 44 formed by the joinder of the legs thereof. Generally, the apex 44 points generally towards the servo valve 16. The first crank 38 as will be most apparent from FIG. 3 preferably has its first and second ends 38 and 42 generally coplanar and its apex 44 offset from the plane of its first and second ends 40 and 42. The apex 44 of the first crank 38 is generally pivotally mounted to a bracket 46 which is itself mounted to the servo valve 16.

In the steering linkage means in the embodiment illustrated, a rod 48 is pivotally mounted at a first floating pivot 49 adjacent the first end 40 of the first crank 38. The rod 48 is operated through movement of the lever 36 as will be apparent from examination of FIG. 1.

A connecting link 50 forms a part of the pump adjusting means 34 and is pivotally mounted by a second floating pivot 51 at a first end 52 thereof adjacent the second end 42 of the first crank 38.

A first generally linearly extending member 54 also forms a part of the pump adjusting means 34. The first member 54 is pivotally mounted adjacent its first end 56 by a third floating pivot 57 adjacent a second end 58 of the connecting link 50. The first member 54 is also pivotally mounted by a fourth floating pivot 59 adjacent its second end 60 to the rotatable arm 18 of the servo valve 16.

A second generally linearly extending member 62 is pivotally mounted by the third floating pivot 57 adjacent its first end 64 adjacent the first end 56 of the first member 54 and the second end 58 of the connecting link.

A second crank 66 is pivotally mounted by a fifth floating pivot 67 adjacent its first end 68 adjacent a second end 70 of the second member 62. The second crank 66 has a generally central second fixed pivot 71, as illustrated in FIG. 3 a pin, intermediate its first end 68 and a second end 72 thereof. The tie rod 32 is pivotally mounted to each of the second cranks 66 by a pair of sixth floating pivots 73 adjacent the second end 72 thereof and serves to directly link their movement. The second crank 66 is generally integrally formed and preferably includes a first generally planar portion 74 extending from the first end 68 thereof, a stud 76 generally perpendicular to said planar portion 74 and extending generally from an end 78 thereof removed from the first end 68 of the second crank 66. A second generally planar portion 80 preferably extends from the stud 76 generally parallel to and spaced from the first planar portion 74 to the second end 72 of the second crank 66. A platform 82 with a bore therethrough to pivotally hold the pin which comprises the second fixed pivot 71 preferably extends from adjacent the second planar portion 80 generally towards the first end 68 of the second crank 66 and generally parallel to the first planar portion 74 and generally removed from said first planar portion 74 a spaced distance equal to the separation between the second planar portion 80 and the first planar portion 74. The connecting link 50 is preferably positioned adjacent the platform 82 intermediate the first planar portion 74 and the platform 82. The apex 44 of the first crank 38 is preferably positioned intermediate the first planar portion 74 and the platform 82 of the second crank 66. Generally, the first member 54 and the second member 62 are both pivotally mounted to the connecting link 50 generally intermediate the first planar portion 74 and the platform 82 of the second crank 66.

As will be more clear by reference to FIGS. 3, 4 and 5, in the preferred embodiment of the invention the platform 82 includes a top 83 for the pin which comprises the second fixed pivot 71 and movable means 84 for contacting the second end 58 of the connecting link 50 for adjustably setting the gain of the pump adjusting means 34. The movable means 84 then comprises a post 86 which includes a channel 88 therein and which is fastened in place by a bolt 90. The positioning of the post 86 can be adjusted by loosening the bolt 90 and displacing the post 86 as restricted by the channel 88 and then finally refastening the bolt 90 once the post 86 is in a desired position. The post 86 is then in position to serve as a stop on the end of a pin 92, which pin 92 serves as the third floating pivot 57 to pivotally hold the first end 64 of the second linear member 62 to the second end 58 of the connecting link 50 and likewise to the first end 56 of the first member 54. Another pin 94 serves as the second floating pivot 51 to hold the first end 52 of the connecting link 50 to the second end 42 of the first crank 38. Yet another pin 96 serves as the fifth floating pivot 67 to hold the first end 68 of the second crank 66 to the second end 70 of the second linear member 62. Similarly, a pin 98 serves as the fourth floating pivot 59 to pivotally fasten the servo valve control arm 18 to the second end 60 of the first member 64. A bolt 100 fixedly pivotally fastens the apex 44 of the first crank 38 to the bracket 46 on the servo valve 16 and thus serves as the first fixed pivot 43.

OPERATION

When the vehicle is to be moved in a forward direction, the tie rod 32 is forced into forward direction as by moving the shift lever 28 forwardly a desired distance. FIG. 1 shows the shift lever 28 in a neutral condition and FIG. 2 shows it in a forward position. The further the lever 28 is thrown forward (F) the faster the vehicle will progress forwardly. This results since the second end 72 of the second crank 66 will be moved the furthest distance leftwardly thus causing the most movement in the rotatable arm 18 attached to the servo valve 16. If the tie rod 32 is moved leftwardly as in FIG. 2 by throwing the lever 28 leftwardly, the second crank 66 is pivoted about the second fixed pivot 71. As this occurs, the second linear member 62 is moved so that the connection made by the pin 92 (third floating pivot 57) is moved correspondingly rightwardly and upwardly. Since the first linear member 54 is pinned to the second linear member 62 by the pin 92 on one end and to the arm 18 at the other end, the pin connection at pin 98 (fourth floating pivot 59) between the arm 18 and the first linear member 54 is moved. This imparts a counter clockwise rotation to the spool of the servo valve 16 resulting in a forward speed commensurate with that particular servo valve setting. Since the tie rod 32 causes identical motion of the two pump adjusting means 34, identical forward speeds will be imparted to the left and right-hand ground engaging means 24 of the vehicle 12. For a reverse operation the lever 28 is simply thrown in the reverse (R) direction with higher speeds generally being attained by further movement in the reverse direction i.e., rightwardly in FIG. 2.

Once the vehicle 12 has been set to moving forwardly at a selected speed as discussed just above, if the operator wishes to make a right turn he can do so through operation of the righthand rod 48. As may be seen, the rod 48 is pivotally attached at first floating pivot 49 to the first end 40 of the first crank 48 generally by a pin. The movement of the rod 48 as indicated by the arrow in the righthand portion of FIG. 2 then causes the first crank 38 to pivot counter clockwise about the first fixed pivot 43 at the apex 44. Since the fourth linear member 54 is connected to the first crank 38 by the connecting link 50, the pins 92 and 94 (second floating pivot 51 and third floating pivot 57) will be moved leftwardly and downwardly responsive to movement of the rod 48 causing rotation of the first crank 38. This will result in movement of the pin 98 (fourth floating pivot 59) which will in turn move the arm 18 clockwise back toward or past zero position of the hydrostatic drive. As a result, the righthand hydrostatic drive output speed will be reduced or reversed relative to the speed of the lefthand drive, resulting in a turn to the right.

If desired, one or both of the levers 36 can be so adjusted relative to the lever 28 whereby one of the ground engaging means 24 is running in a reverse direction while the other ground engaging means 24 is running in a forward direction at about the same speed. This leads to a spot turn capability for the vehicle which is highly desirable in many use conditions.

While the invention has been described in connection with specific embodiments thereof, it will be understood that it is capable of further modification, and this application is intended to cover any variations, uses or adaptations of the invention following, in general, the principles of the invention and including suc departures from the present disclosure as come within known or customary practice in the art to which the invention pertains and as may be applied to the essential features hereinbefore set forth, and as fall within the scope of the invention and the limits of the appended claims.

That which is claimed is:

1. In a control system for a hydrostatic drive of a vehicle comprising a pair of hydrostatic pumps the output of each of which is controlled by an arm extending from servo valve means mounted thereon, the fluid output of each pump powering a respective hydraulic motor which drives a respective ground engaging means of said vehicle, an improved mechanical arrangement for controlling the steering and speed function of said system, comprising:
   A. a pair of pump adjusting means, one communicating with each of said pumps, each adjusting means comprising:
      1. a first crank having a first end and a second end, pivotally mounted intermediate said ends adjacent a respective one of said pumps;
      2. steering linkage means drivingly linked adjacent the first end of said first crank;
      3. connecting link means drivingly linked adjacent a first end thereof adjacent the second end of said first crank;
      4. first linkage means drivingly linked adjacent its first end adjacent a second end of said connecting link means and drivingly linked adjacent its second end to said arm of said servo valve;
      5. second linkge means drivingly linked adjacent its first end adjacent said first end of said first linkage means and said second end of said connecting link means; and
      6. a second crank drivingly linked adjacent its first end adjacent a second end of said second linkage means; and
   B tying means drivingly mounted adjacent a second end of each of said second cranks linking their movement.

2. In a hydrostatic control system for a ground driven vehicle comprising a pair of hydrostatic pumps each controlled by an arm extending from servo valve means mounted thereon, a pair of hydrostatic motors each driven by the fluid output of a respective one of said pumps and a pair of ground engaging means each on a respective side of said vehicle, an imroved mechanical arrangement for controlling the steering and speed functions of said system, comprising:
   A. a pair of pump adjusting means, one communicating with each of said pumps, each adjusting means comprising:
      1. a first crank having a first and a second end, pivotally mounted intermediate its ends adjacent a respective one of said pummps;
      2. steering linkage means pivotally mounted adjacent the first end of said first crank;
      3. a connecting link having a first end pivotally mounted adjacent the second end of said first crank;
      4. a first generally linearly extending member pivotally mounted adjacent its first end adjacent a second end of said connecting link and pivotally mounted adjacent its second end to said arm of said servo valve means;
      5. a second generally linearly extending member pivotally mounted adjacent its first end adjacent said first end of said first member and said second end of said connecting link; and
      6. a second crank pivotally mounted adjacent its first end adjacent a second end of said second member; and
   B. tie rod means pivotally mounted adjacent the second ends of each of said second cranks linking their movement.

3. An improved mechanical arrangement as in claim 2, wherein said second crank includes a first generally planar portion extending from the first end thereof, a stud generally perpendicular to said planar portion and extending generally from an end thereof removed from said first end of said second crank, said second generally planar portion extending from said stud generally parallel to and spaced from said first planar portion to the second end of said second crank, and a platform fixedly pivotally mounted adjacent said respective one of said pumps extending from adjacent said second planar portion generally towards said first end of said second crank, said connecting link is positioned adjacent said platform intermediate said first planar portion and said platform includes movable means upraised therefrom for contacting said second end of said connecting link for adjustably setting the gain of said pump adjusting means.

4. An improved mechanical arrangement as in claim 3, wherein said first crank is generally V-shaped, is pivotally mounted adjacent an apex formed by the joinder of the legs thereof with said apex generally towards said servo valve, has its first and second ends generally coplanar and its apex offset from the plane of said first and second ends, said apex being positioned intermediate said first planar portion and said platform of said second crank.

5. An improved mechanical arrangement as in claim 4, wherein said first and second members are both pivotally mounted to said connecting link generally intermediate said first planar portion and said platform of said second crank.

6. An improved mechanical arrangement as in claim 5, wherein said first crank is pivotally mounted adjacent its apex to a bracket mounted to said servo valve.

7. An improved mechanical arrangement as in claim 6, including servo valve null adjusting means.

* * * * *